United States Patent

[11] 3,540,543

| [72] | Inventor | Marvin G. Bays<br>Jackson, Mississippi |
|---|---|---|
| [21] | Appl. No. | 789,273 |
| [22] | Filed | Jan. 6, 1969 |
| [45] | Patented | Nov. 17, 1970 |
| [73] | Assignee | Continental Oil Company<br>Ponca City, Oklahoma<br>a corporation of Delaware |

[54] MARINE ACOUSTIC ENERGY SOURCE
7 Claims, 2 Drawing Figs.

| [52] | U.S. Cl. | 181/.5 |
|---|---|---|
| [51] | Int. Cl. | G01v 1/38 |
| [50] | Field of Search | 181/.5H,<br>15H; 340/12 |

[56] References Cited
UNITED STATES PATENTS

| 3,322,232 | 5/1967 | Chalmers et al. | 181/.5 |
|---|---|---|---|
| 3,369,519 | 2/1968 | Bricout | 181/.5 |
| 3,434,562 | 3/1969 | Johnson | 181/.5 |

*Primary Examiner*—Rodney D. Bennett, Jr.
*Assistant Examiner*—Brian L. Ribando
*Attorneys*—Joseph C. Kotarski, Henry H. Huth, Jerry B. Peterson, William J. Miller and David H. Hill ABSTRACT: Apparatus for generating compressional seismic wave energy in a water medium, the apparatus consisting of a high volume, low pressure fluid source connected to a chamber having controllable outlet port openings in communication with its surrounds, and having pressure accumulator means disposed therein. A suitable form of linear actuator is mounted axially on the chamber to control a porting sleeve which is reciprocally movable to periodically open the outlet port openings at a controlled rate; and the rapid volume differentiation results in generation of a compressional wave within the water medium.

Patented Nov. 17, 1970

3,540,543

INVENTOR.
MARVIN G. BAYS
BY
William J. Miller
ATTORNEY

MARINE ACOUSTIC ENERGY SOURCE

BACKGROUND OF THE INVENTION

1. Field of the Invention

The invention relates generally to seismic energy sources and, more particularly, but not by way of limitation, it relates to improved compressional wave generating apparatus for use as a seismic energy source within a water medium.

2. Description of the Prior Art

The prior art includes several types of acoustic energy generators of the type which operates on the water-siren principle to generate an identifiable acoustic energy output. The prior types of generators have been designed for use in the more low-power applications such as water depth sounding, fish finding, defogging and various other applications which are more closely related to that art which is referred to as the sonar technology. Certain of these teachings extend even to the practice of am and fm modulation of hydroacoustic energy for specific marine sounding and communication applications.

The prior art forms of mechanical compressional wave generator for seismic energy applications have generally been restricted to the piston type wherein a transducer radiating surface is reciprocally driven sinusoidally by a high-power electrohydraulic servo system. Such prior art seismic generators have been subject to various chronic problems tending to limit reliability in coupling energy to the water medium, such problems stemming from inherent structural defects and weaknesses.

SUMMARY OF THE INVENTION

The present invention contemplates a seismic energy vibrator wherein a high volume, low pressure fluid flow is released at a controlled rate into a surrounding water medium thereby to generate compressional wave energy. In a more limited aspect, the invention consists of a source of high volume, low pressure fluid and means for conducting it to an acoustic energy generator assembly which is immersed down within a fluid or water medium. The generator assembly consists of a first chamber, including pressure accumulation means therein, for receiving the fluid from said supply source and introducing it into a second chamber which includes porting orifices leading to the surrounding medium. A porting sleeve is reciprocally driven to open and close the porting orifices at a controlled rate as a suitable form of drive is employed to reciprocate the porting sleeve at a preselected rate which may be determined by surface control equipment.

Therefore, it is an object of the present invention to provide a marine seismic source which is capable of greater output power of compressional wave energy than has been available with prior vibratory types of acoustic energy sources.

It is also an object of the present invention to provide a marine seismic energy source which is less subject to break down and which is less sensitive to variations in depth within the water medium.

It is still a further object of the present invention to provide a seismic energy transducer which attains higher intensity of energy output at reduced cost as compared to present known techniques.

Finally, it is an object of the present invention to provide generation of a higher acoustic energy output which, in turn, enables marked improvements in signal-to-noise ratio in receiving and processing returned seismic signals.

Other objects and advantages of the invention will be evident from the following detailed description when read in conjunction with the accompanying drawings which illustrate the invention.

DETAILED DESCRIPTION OF THE INVENTION

Figure 1:
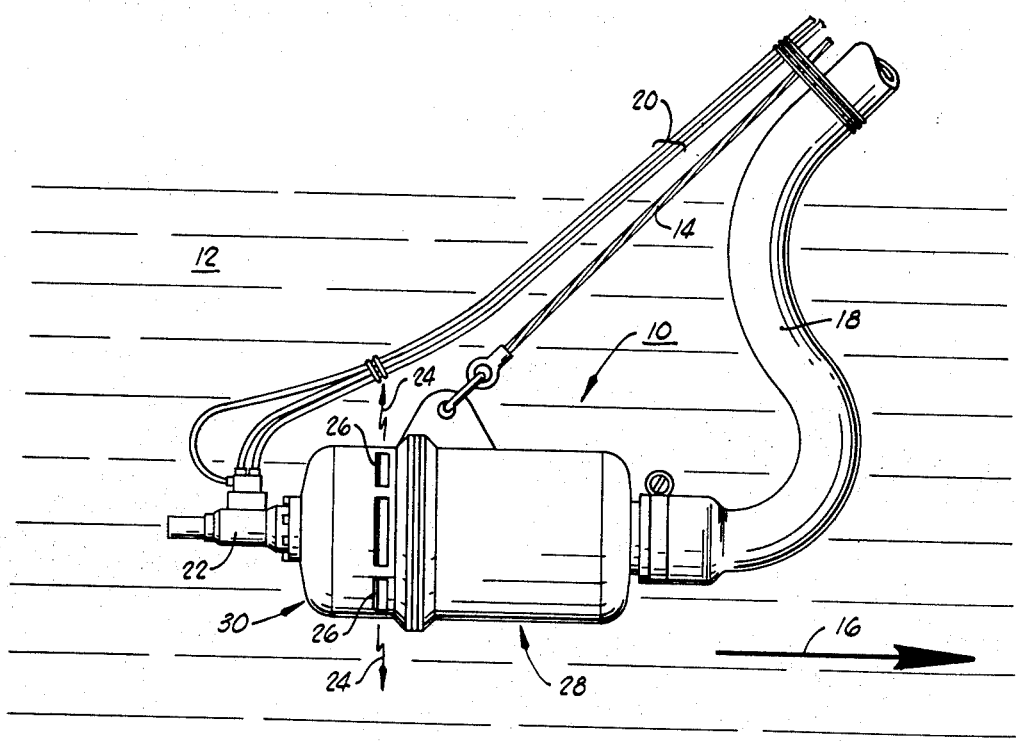
FIG. 1 is a side elevation of a generator assembly as constructed in accordance with the invention, the generator assembly being in its towed or operative attitude.

As shown in FIG. 1, a seismic energy generator assembly 10 may be immersed within a fluid or water medium 12 by means of a tow cable 14 for continuous moving disposition in the direction as shown by arrow 16. The generator assembly 10 receives input pressure from an input conduit 18 which may be led up to a surface support vehicle, tow vessel, or whatever. Input conduit 18 may be formed into a bundle along with tow cable 14 and various hydraulic and electrical lines without a control line 20, all of which are led up to the supporting control equipment. A linear actuator 22 axially mounted on one end of generator assembly 10 is controlled by the control lines 20 to effect acoustic energy or compressional wave output in the water medium as indicated generally by arrows 24 emanating from a plurality of port openings 26.

Figure 2:
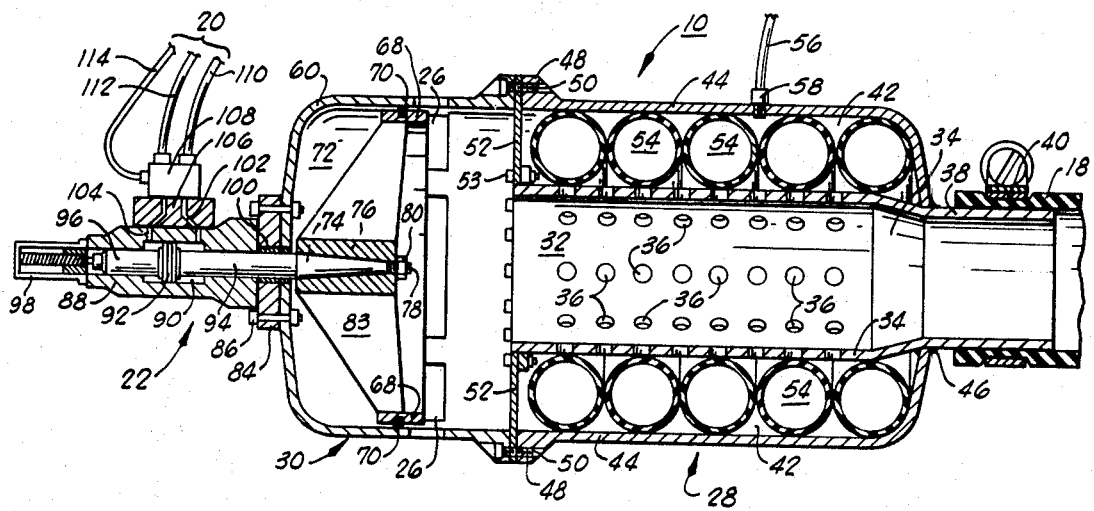
FIG. 2 is a vertical cross section through the generator assembly of FIG. 1.

Referring also to FIG. 2, the generator assembly 10 consists of a first chamber 28, which receives low pressure operating fluid input from input conduit 18, and a second chamber 30, which provides housing for porting structure as will be described below. An inner chamber 32 is formed by an inner housing 34 which is formed to have a plurality of perforations or holes 36 therethrough. Inner housing 34 is extended outward in the form of a coupling neck 38 which may receive the input conduit 18 securely therearound as clamped by a suitable ring clamp 40 or other such conventional securing means. The particular type of securing means or ring clamp 40 is not particularly critical since input conduit 18 carries a high volume yet only low pressure input to the inner chamber 32.

An outer chamber 42 of first chamber 28 is formed by an outer enclosure housing 44 extending generally around the inner housing 34. The outer housing 44 may be formed from suitable structural steel of desired strength and it may be affixed in sealing affixture about inner housing 34 at a first end 46. For the sake of accessability and convenience of maintenance, the other end of outer housing 44 may be formed with a flange 48 having a plurality of fastener holes 50 spaced therearound. Also, a ring plate 52 is secured between outer housing 44 and inner housing 34 such that it defines the annular end of outer chamber 42. The inner circumference or edge of ring plate 52 may be removably affixed about inner housing 34 as by a spaced plurality of fasteners 53.

The outer chamber 42 serves to provide a pressure accumulation function. Thus, as it is in communication through holes 36 with the inner flow line or inner chamber 32, one or more pliable pressure devices 54 can distend in proportion to differential pressure within outer chamber 42 to reduce or eliminate pressure variation reflection as might be seen at the pressure input conduit 18. The pressure devices 54 may be such as inflatable rubber donuts, there being one or more depending upon design exigencies, which devices 54 are formed for convenient disposition within the annular space of outer chamber 42. Also, an optional feature might be an external air hose 56 leading down from a controllable surface source for input to a feed-through fitting 58 in outer housing 44. While not specifically shown, additional air lines from feed-through fitting 58 may be supplied to any one or all of the individual pressure devices 54 to enable surface adjustment for various operating advantages.

The second chamber 30 consists of a bell housing 60 having its flared end terminated as a flange 62 having a plurality of fastener holes 64 spaced therearound. A plurality of suitable fasteners 66 may then be secured through respective securing holes 50 and 64 of flanges 48 and 62 thereby to secure the first chamber 28 and second chamber 30 together in end-to-end axial alignment. While not specifically shown, a suitable gasket or sealing and cementing means may be provided at the facing of flanges 48 and 60; however, it is a low pressure application and it is not anticipated that any sealing problems should occur.

While six equispaced, rectangular port openings 26 are shown, it should be understood that the configuration and number of such port openings 26 may be varied within wide design limits so long as sufficient porting or orifice area is provided. Also, the configuration must be dictated to some degree by its ability to enable rapid opening and closure by means of a porting sleeve 68 which is disposed for reciprocation within bell housing 60. A suitable sealing ring 70, e.g. a commercially available type of teflon sealing ring may be disposed in seated engagement around the circumference of porting sleeve 68.

The porting sleeve 68 is formed by an outer or circumferal ring which is disposed to move reciprocally in a chamber 72 within bell housing 60. The porting sleeve 68 is secured for reciprocal movement with a tapered piston rod 74 by means of a taper block 76 which is securely drawn therealong. Taper block 76 may be secured as by welding to a plurality of gussets 82 which, in turn, extend out for connection to equispaced points around porting sleeve 78. A threaded extension 78 of piston rod 74 provides secure fastening of taper block 76 by means of a nut 80. The plurality of gussets 82 may be, for example, a quadrature arrangement sufficient to provide the necessary rigidity.

The linear actuator 22 is mounted along the axis of bell housing 60 by such as flange collar 84 secured by a plurality of suitable fasteners 86. Such linear actuators 22 of similar configuration have been previously disclosed in detail in various patent applications which have been filed by the present assignee. For example, the U.S. Pat. No. 3,329,930 entitled "Marine Vibration Transducer" and issued on July 4, 1967 in the name of J.R. Cole et al. provides complete teaching of the similar form of hydraulic linear actuator.

This type of actuator 22 calls for a cylinder member 88 which is sealingly affixed to collar flange 84 by suitable fastening, and which is disposed in axial alignment with the bell housing 60. The cylinder member 88 defines a reaction chamber 90 wherein a piston 92 is reciprocated. The piston 92 is formed to have plural land and ring portions (not specifically shown) about its circumference, and it is formed to have a first end extension 94 which is terminated as the tapered rod extension 74 within bell housing 60, as well as a second end extension 96 which reciprocates for interaction with a selected linearly variable differential transformer or LVDT assembly 98 secured axially on the outer end of cylinder member 88. The use of such LVDT devices in servo feed back networks is well known in the art, and a suitable type which may be employed is a Model No. 585-DT-1000 which is commercially available from the Sandborn Company of Walton, Mass.

Various bearing or antifriction packing devices are employed along the surfaces between the piston rod ends 94 and 96 and their respective adjacent portions of cylinder member 88. Such practice is well known in the art. An additional bearing packing 100 of conventional type is disposed between collar flange 84 and rod end 94.

The piston 92 is reciprocated in response to differential pressure as between opposite sides of reaction chamber 90. Such differential pressure is controllably applied through ports 102 and 104 leading through a manifold 106 to servo control valve 108. The servo control valve 108 receives input and output of hydraulic high pressure through respective hoses 110 and 112 of control lines 20. An electrical cable 114 leading from the surface control station provides regulation of the servo valve 108 which, in turn, controls the amplitude and frequency of reciprocation of piston 92. As previously stated, the actuator 22 as controlled by servo valve 108 and associated control lines 20 is well known in the related art and such prior known structure has been disclosed in detail in numerous previous applications, e.g. the aforementioned U.S. Pat. No. 3,329,930.

OPERATION

A seismic energy source such as the acoustic energy generator assembly 10 has the ability to provide increased compressional wave power output for a given cost and complexity of seismic system. That is, it is contemplated that a geophysical prospecting vessel can trail two such source units as the generator assemblies 10, each being relatively inexpensive and reliably operated structures, this array to replace as many as four energy sources of the conventional piston type without appreciable loss of output power. A liquid modulation source such as generator assembly 10 is also susceptible of highly accurate control as to amplitude and frequency of the output compressional waves. For this reason, such sources are especially attractive for use in the vibrational type of prospecting systems wherein input energy to the earth and substrata takes the form of precise frequencies for specific durations. That is, a seismic energy input to the earth may consist of a train of cyclical compressional waves of, for example, 6 or 7 seconds duration and varying in frequency at a predetermined rate from as little as two-cyles per second upward to as much as one hundred and even higher hertz values.

The flow modulation transducer generates a compressional wave in a water medium by modulation of a low pressure, high volume water flow through an orifice into the surrounding medium. Flow modulation may be controlled by such as an electrohydraulic servo system or such. The generating assembly 10 is omnidirectional, radiating compressional wave energy outward from what is, effectively a point source, and the radiating surface of the transducer is the surface of the differential volume which is introduced into the media through the port openings 26. Radiated acoustic power may be determined in proportion to the flow impedance downstream from the port openings.

In beginning operation, the generating assembly 10 may be initially adjusted for a predetermined depth of operation. The pressure devices 54, one or more depending upon design, are adjusted to a preset pressure, this depending upon depth of operation. It has been found that a pressure slightly greater than the water pressure within the generator assembly 10 is suitable for most applications. This will be a function of the resiliency of the individual pressure devices 54, but operating characteristics for each particular design and operating depth may be readily compiled. In its operating attitude, the generator assembly 10 is towed or trailed in the water as supported by tow cable 14 whereupon it is energized to generate a controlled acoustic energy output by application of input liquid through input conduit 18 with periodic release through the port openings 26 as effected by actuator 22, control lines 20 and whatever the shipboard facility for generating the desired control signal input via control lines 20. Thus, a high volume, low pressure flow of liquid is applied through the relatively large diameter input conduit 18 for input into the inner chamber 32 of first chamber 28. The pressure of liquid in pounds per square inch at input conduit 18 is of such value that it establishes a differential pressure of about 20 pounds per square inch relative to the ambient water pressure.

Flow of input liquid through the inner chamber 32 can proceed to the area of port openings 26 whereupon its flow outward through the port opening is modulated by reciprocation of the porting sleeve 68. The porting sleeve 68 is driven by the linear actuator 22 at a predetermined rate of frequency and through selected frequency sweeps. Thus, hydraulic pressure as applied between hydraulic lines 110 and 112 is controlled by servo valve 108 in accordance with electrical input via cable 114 such that hydraulic fluid application to reaction chamber 90 reciprocates piston 92 and its associated rod ends 94 and 96 at a predetermined rate. This reciprocation is, in turn, transmitted to the porting sleeve 68 which is sealingly reciprocated by virtue of the teflon sealing ring 70 disposed about the outer circumference. Porting sleeve 68 opens and closes each of the port openings 26 to provide sinusoidal modulation of fluid flow through port openings 26. This sinusoidal flow constitutes a differentiated volume which gives rise to compressional wave output of proportional rate and amplitude.

When the piston 92 is extended such that porting sleeve 68 closes the port openings 26, the pressure devices 54 serve in a pressure accumulation capacity by absorbing the differential pressure change to approach a constant orifice pressure at the port openings 26. The accumulation effect prevents pressure reflection problems along inner chamber 32 and input conduit 18 such that port openings 26 can be opened and closed with great rapidity while maintaining sinusoidally varying volume change therethrough in stable and reliable manner.

It is contemplated that the flow modulation type of transducer is capable of generating relatively higher power outputs of compressional wave energy per unit as compared to the prior types such as the "piston-type" transducer which was entirely dependent upon its radiating surface in contact with the water by a high-power electrohydraulic servo system such that maximum power output was limited by power capability of the servo-valve mechanism. Such direct dependency upon power output is eliminated in the present type of flow modulation generator assembly 10 since the electrohydraulic servo system is only utilized to modulate a flow through an orifice, this operation requiring much less power.

The foregoing discloses a novel marine seismic energy source capable of generating compressional waves in a water medium with greater efficiency and reliability, and the device requires a much reduced cost of construction and maintenance. In addition to this, seismic energy sources constructed in accordance with the present teachings have the capability of generating a sinusoidal compressional wave form which is much less distorted in its output wave form; the combined effect of increased signal fidelity and increased power output tending to enable a higher signal-to-noise ratio as regards an overall vibrational seismic energy prospecting system.

Changes may be made in the combination and arrangement of elements as heretofore set forth in the specification and shown in the drawings; it being understood that changes may be made in the embodiment disclosed without departing from the spirit and scope of the invention as defined in the following claims.

I claim:

1. A device for generating acoustic energy in a fluid medium, comprising:
    housing means in the form of an enclosure having a hollow interior which communicates with a first opening at a first end of the housing means and with a port opening at a second end of the housing means;
    fluid supply means including a conduit sealingly connected to said housing means first opening to supply fluid at a predetermined pressure to said hollow interior;
    porting means which is reciprocally movable in said housing means port opening to alternately open and close said port opening;
    actuator means rigidly affixed to said housing means and connected to drive said porting means reciprocally;
    control means connected to drive said actuator means to reciprocate said porting means at a selected cyclical rate; and
    inflated resilient bodies disposed within said housing means hollow interior in noninterfering relationship to fluid flowing therethrough, said bodies providing pressure equalization.

2. A device as set forth in claim 1 wherein said housing means comprises:
    first chamber means;
    inner chamber means disposed coaxially through said first chamber means in communication with said first and port openings, said inner chamber means being perforated; and
    resilient enclosure means inflated to a selected internal pressure and disposed to fill substantially said first chamber means around said inner chamber means.

3. A device as set forth in claim 1 wherein said rigid housing comprises:
    first chamber means;
    inner chamber means disposed coaxially through said first chamber means in communication with said first and port openings, said inner chamber means being perforated; and
    wherein said resilient enclosure means are inflated to a selected air pressure and disposed to fill substantially said first chamber means outer portion surrounding said inner chamber means.

4. A device as set forth in claim 1 wherein said porting means comprises:
    porting sleeve means affixed at a central point to said actuator means and being reciprocal in response thereto; and
    sealing means movably disposed between said porting sleeve means and said housing means.

5. A device as set forth in claim 1 wherein said porting means comprises:
    porting sleeve means affixed at a central point to said actuator means and being reciprocal in response thereto; and
    sealing means movably disposed between said porting sleeve means and said housing means.

6. A device as set forth in claim 1 wherein said housing means comprises:
    first chamber means;
    inner chamber means disposed coaxially through said first chamber means in communication with said first and port openings, said inner chamber means being perforated; and
    resilient enclosure means inflated to a selected internal pressure and disposed to fill substantially said first chamber means around said inner chamber means.

7. A device as set forth in claim 1 wherein said actuator means comprises:
    hydraulic linear actuator means; and
    servo control means affixed to said actuator means and being electrically and hydraulically connected to said control means.